United States Patent [19]

Brandt

[11] 3,965,430

[45] June 22, 1976

[54] ELECTRONIC PEAK SENSING DIGITIZER FOR OPTICAL TACHOMETERS

[75] Inventor: Arnold W. Brandt, Livonia, Mich.

[73] Assignee: Burroughs Corporation, Detroit, Mich.

[22] Filed: June 18, 1975

[21] Appl. No.: 587,992

Related U.S. Application Data

[63] Continuation-in-part of Ser. No. 428,616, Dec. 26, 1973, abandoned.

[52] U.S. Cl. ............................. 328/20; 73/229; 307/233 R; 307/261; 324/175; 328/28; 328/140; 340/190
[51] Int. Cl.² .................. H03K 5/08; H03B 19/00; G01P 3/36; G01F 1/06
[58] Field of Search .............. 328/20, 28, 38, 140, 328/163, 165; 307/220, 233, 261, 295; 324/175; 73/229–231; 340/190

[56] References Cited

UNITED STATES PATENTS

| 3,204,119 | 8/1965 | Gray | 328/163 |
|---|---|---|---|
| 3,289,089 | 11/1966 | Linder | 328/165 |
| 3,808,543 | 4/1974 | Mueller | 328/20 |
| 3,814,934 | 6/1974 | Mesh et al. | 324/175 |
| 3,821,896 | 7/1974 | Grob | 324/175 |

Primary Examiner—Stanley D. Miller, Jr.
Attorney, Agent, or Firm—Ronald L. Taylor; Edwin W. Uren; Kevin R. Peterson

[57] ABSTRACT

A system for accurately digitizing a signal from a high density optical tachometer using a psuedo zero-crossing detector for subsequent use in a speed measuring device. An added enhancement of the system is the ability to double the frequency response of the input signal to thereby provide a more sensitive indication of incremental speed changes.

8 Claims, 3 Drawing Figures

ELECTRONIC PEAK SENSING DIGITIZER FOR OPTICAL TACHOMETERS

CROSS REFERENCE TO RELATED APPLICATIONS

This application is a continuation-in-part of application Ser. No. 428,616, filed on Dec. 26, 1973 by the present inventor and now abandoned.

BACKGROUND OF THE INVENTION

This invention relates generally to a device for giving an indication of the speed of a rotating member and particularly to an apparatus for digitizing a sinusoidal signal from an optical tachometer or similar transducer attached to the rotating member.

There is a need to find a system that will accurately digitize a high density sinusoidal signal from an optical tachometer. The working environment is such that the optical tachometer will often present the digitizing system with a relatively noisy sinusoidal signal consisting of spikes and amplitude modulation making it difficult for the system to track the incoming signal especially at high frequencies. Systems using a conventional zero-crossing method are incapable of accurately operating in such an environment.

An additional problem is that the higher the density of the sinusoidal signal, the greater is the need to be able to sense very quickly incremental speed changes. Any delays in reacting to such changes degrade the systems ability to accurately indicate the actual state of the incoming signal at any point in time.

SUMMARY OF THE INVENTION

It is thus an object of the present invention to provide a system that will accurately digitize a high density sinusoidal signal.

It is another object of the invention to eliminate noise in the signal to be digitized without degrading the basic characteristics of the signal needed to ultimately extract information therefrom.

It is still a further object of the invention to provide an output signal whose frequency is proportional to the change in slope direction or frequency of the input signal.

It is yet another object of the invention to preclude an input signal having the same frequency slope direction as its predecessor from being processed.

With these objects in mind, a circuit has been designed which will accurately digitize a sinusoidal signal from an optical tachometer for subsequent speed measurement. An optical tachometer is operatively disposed on a rotating shaft whose speed it is desired to measure. The sinusoidal signal from the optical tachometer is sent over a line to what may be a remotely located differential amplifier. The output of the amplifier is then sent to a low pass filter. The filtered output of the device is in turn sent to a buffer amplifier where the signal is amplified and sent to an artifical delay line to be delayed. The resultant delayed signal is then sent to a comparator with hysteresis. The digitized output from the comparator is sent in separate parallel lines to first and second pulse generators. The first and second pulse generators are operative to trigger on opposite polarity slopes. Both of the outputs from the first and second pulse generators are inputted to an OR gate. This gated signal has a pulsating frequency double that of the original input signal and represents the ultimate output of the system which may then be used in a digitized speed measuring device.

BRIEF DESCRIPTION OF THE DRAWINGS

These and other objects and features of the invention are described in the following description in terms of the preferred embodiment thereof which is shown in the accompanying drawing figures. It is to be understood, however, that the embodiment described herein is to be regarded as representative only and is not to be taken as a definition of the limits of the invention. Reference is to be had to the appended claims for this purpose.

FIG. 3 is a schematic diagram of the line delay device of FIG. 1.

DESCRIPTION OF THE PREFERRED EMBODIMENT

Figure 1:
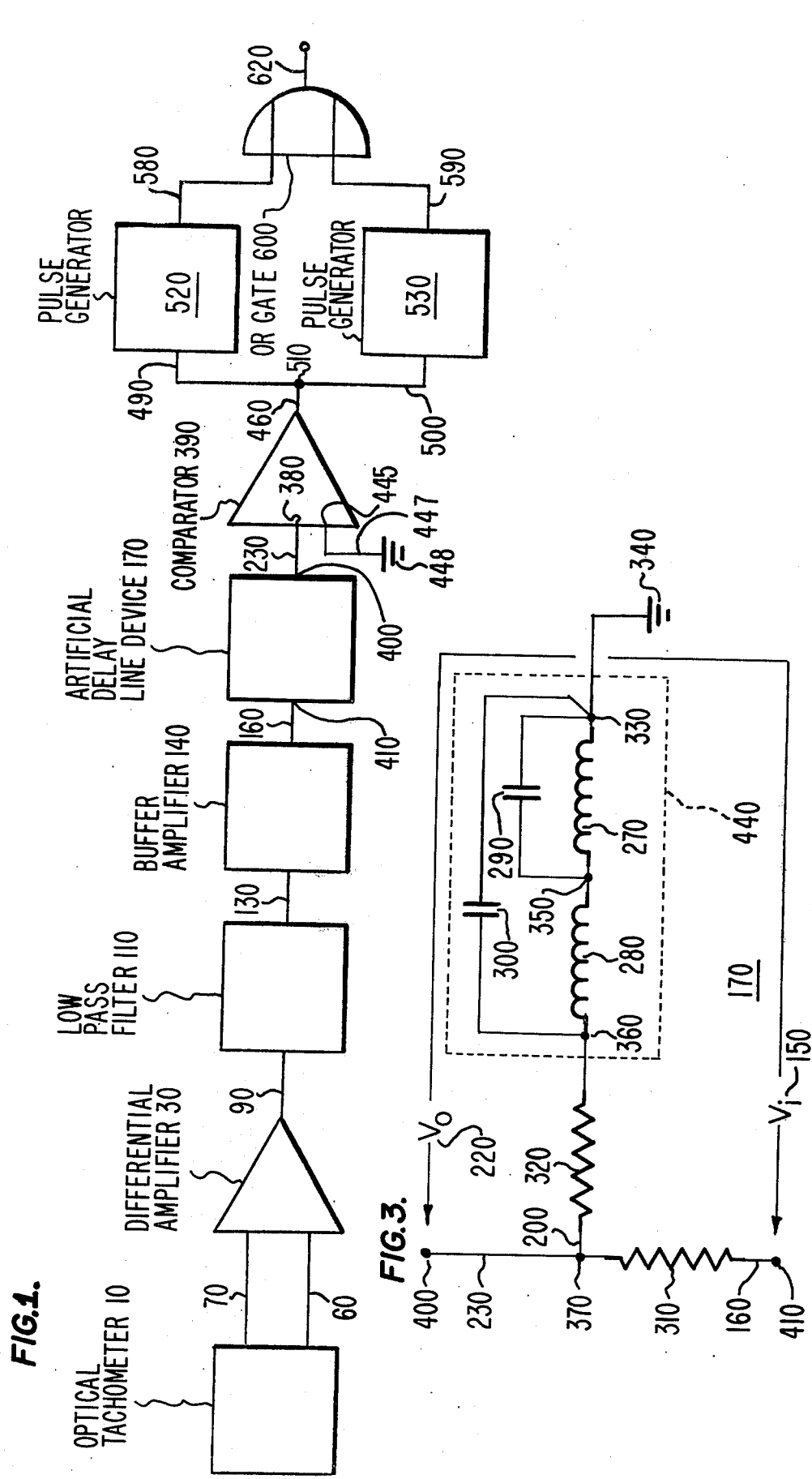
FIG. 1 is a block diagram of the various components of the invention.
Figure 2:
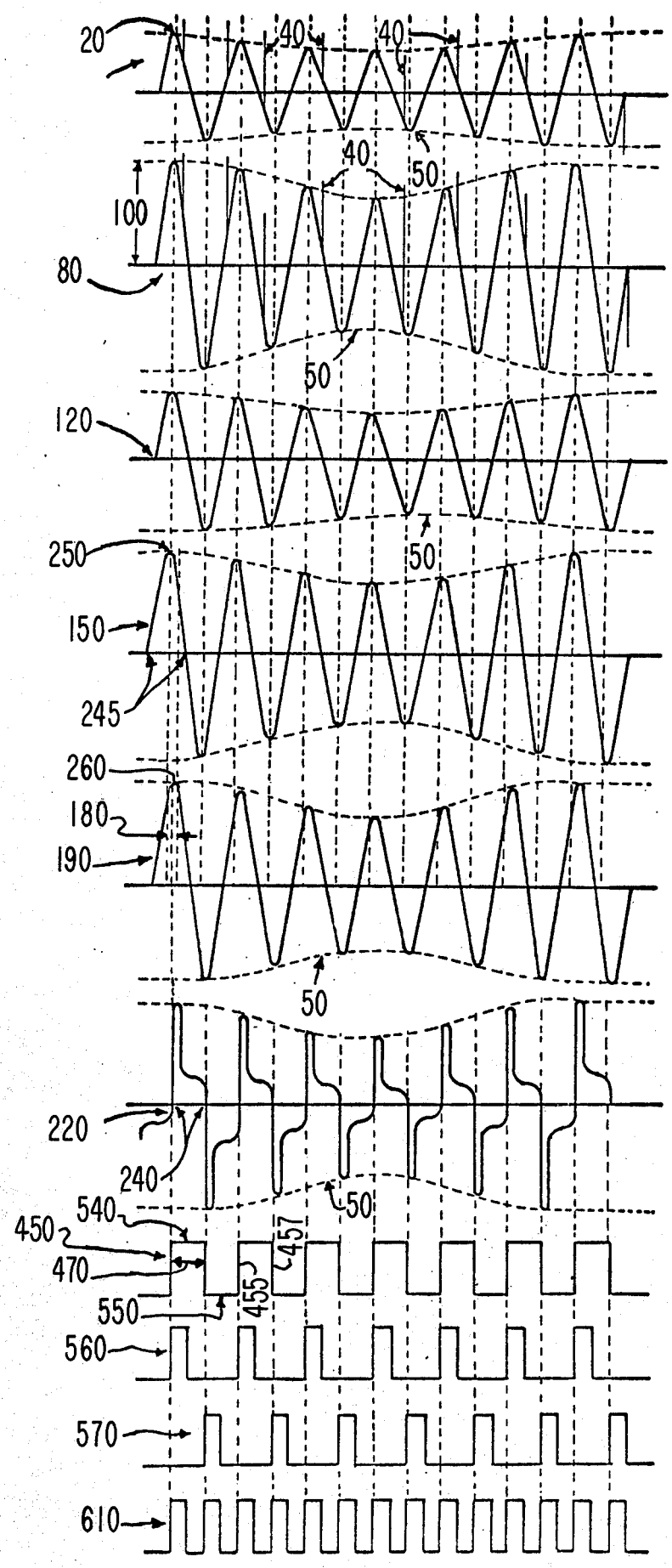
FIG. 2 is a timing diagram of the signal as it appears at various points in the diagram of FIG. 1.

Referring to FIGS. 1 and 2, a transducer such as an optical tachometer 10 (FIG. 1) of a type commonly used is operative to output a sinusoidal signal 20 (FIG. 2) having an average frequency of 6KC when a shaft (not shown) is rotating, the tachometer 10 being operatively coupled to the shaft. This sinusoidal signal 20, that a differential amplifier 30 ultimately receives, will usually travel over a line for a relatively long distance during which line-induced noise spikes 40 will be picked up and amplitude modulation (A.M.) noise 50 caused by imperfections in the tachometer itself will be induced, thus causing interference.

The differential amplifier 30, as is well known in the art, subtracts a non-signal carrying line 60 from a signal carrying line 70 having the sinusoidal signal 20, the net effect being the outputting of a signal 80 along the line 90 that has eliminated much but not all of the line induced noise spikes 40. Some legitimate amplification 100 of the sinusoidal signal 80 by the differential amplifier 30 for driving purposes is also engendered.

The sinusoidal signal 80 on line 90 is next passed through a low pass filter 110 which eliminates the remainder of the high frequency noise spikes 40 and outputs a signal 120 on the line 130. Due to the inherent characteristics of the filter 110, however, some amplification loss of the outputted signal 120 is incurred. This loss is made up in a buffer amplifier 140 in which a signal 150 on the line 160 drives a subsequent artifical delay line device 170.

The artifical delay line device 170 is an impedance network that may be set to delay the sinusoidal signal 150 anywhere from phase shift 180 of 0° to 180° depending on its chosen values of resistance, capacitance and inductance as is well known in the art. The phase shift 180 in the preferred embodiment being 45°. Referring to FIG. 3, a delayed signal 190 on line 200 is subtracted from the original undelayed signal 150 on line 160. A composite or resultant, delayed signal 220 on line 230 is of zero amplitude 240 a short time after the original undelayed signal 150 peak amplitude points 250 on line 160, that is after peak 250 and before the delayed signals peak 260. More precisely, at the point in time when the zero amplitude points 240 of the resultant delayed signal 220 occur, the voltage of the undelayed signal 150 is 0.707 of the undelayed voltage peak 250. The factor 0.707 is obtained by taking the sine of the phase angle 45° which is $\sqrt{2/2}$ or 0.707 as is commonly known to those skilled in the art. The short time delay, which is proportional to the given impedance or resultant phase shift, 45°, remains uniform regardless of the input signal 20 response on line 70 because the signal is compared to itself in effect.

As again shown in FIG. 3, the physical structure of the delay device 170 includes inductors (L) 270 and 280 each having 100μh, capacitors (C) 290 and 300 each having 0.06μf, resistors (R) 310 having 40Ω and 320 having 6Ω (L) 270 is connected in parallel with capacitor (C) 290 with one of their common terminals 330 connected to ground 340. Their other common terminal 350 is connected to one end of (L) 280. At the other terminal end 360 of (L) 280, is (C) 300 which is connected in parallel over to ground 340 at terminal 330. The terminal 360 is connected for diagrammatic purposes to (R) 320 which is the equivalent resistance considered to be embedded in (L) 270 and (L) 280. The other end of (R) 320 is connected to a terminal 370 which branches off to resistor (R) 310 on one side and on the other side to the input 380 of comparator 390 at terminal 400. (R) 310 is connected on its other side at terminal 410 to the buffer amplifier 140. (R) 320 is the characteristic impedance which may be computed as:

$$R\ (320) = \sqrt{\frac{L\ (270)}{C\ (290)}} = \sqrt{\frac{100\ \mu h}{.06\ \mu f}} \cong 40\ \Omega$$

For purposes of showing how the voltage delay phase angle 45° is computed, the input voltage or undelayed voltage signal 150, Vi, to delay line 170 will be measured from terminal 410 of (R) 310 to ground 340 and the output voltage, Vo, representing the delayed resultant voltage 220 will be measured from the terminal 400 to ground 340. As mentioned earlier, the system is normally run at $f=6KC$, which is substantially below the resonant point of device 170 to insure a stable non-resonating condition. Computing first the reactance X, comprising (L) 270, (L) 220, (C) 290 and (C) 300 of the device 170 using complex numbers where $w = 2\overline{\Pi f} = 3.77 \times 10^4$, $L_1$ 32 (L) 270, $L_2 =$ (L) 280, $C_1 =$ (C) 290 and $C_2 =$ (C) 300, we find that:

$$X = \left[\frac{\left(\left(\frac{jwL_1 \times \frac{1}{jwC_1}}{jwL_1 + \frac{1}{jwC_1}}\right) + jwL_2\right) \times \frac{1}{jwC_2}}{\left(\left(\frac{jwL_1 \times \frac{1}{jwC_1}}{jwL_1 + \frac{1}{jwC_1}}\right) + jwL_2\right) + \frac{1}{jwC_2}}\right] \cong 8j\ \Omega$$

Next, the impedance for the output voltage, Vo 220, and input voltage Vi 150, will be represented as $Z_o = R_2 + jX$ and $Z_i = (R_1 + R_2) + jX$, respectively, where $R_1 =$ (R) 310, and $R_2 =$ (R) 320 and X = X 440. Thus, computing the phase angle and gain of the device as expressed in polar form:

$$\frac{V_o}{V_i} = \frac{Z_o}{Z_i} = \frac{R_2 + jX}{(R_1 + R_2) + jX} = \frac{6 + j8}{(40 + 6) + j8} \cong \frac{|10|\ \underline{/53°}}{|47|\ \underline{/10°}} \cong |0.21|\ \underline{/45°}$$

Where 45° is the phase angle and 0.21 is the gain. Thus Vo, the resultant delayed signal 220 is delayed by 45° relative to Vi, the original undelayed signal 150. It will be noted that the buffer amplifier 140 preceding the delay device 170 overamplifies somewhat to compensate for the deamplification of the delay device 170 since the device 170 gain is less than one.

The comparator 390 which receives the resultant delayed signal 220 on line 230 is operative to make a signal transition every time a change in frequency slope direction of the incoming resultant signal 220 is sensed. In the preferred embodiment the comparator 390 may be a Fairchild model μA709 as found on page 25 of the November 1971 Linear IC Data Catalog which is operative to function as a high speed analog-digital converter as it is used here. Setting the reference point or inverting input 445 of the comparator 390 to ground 448 on line 447, will allow the comparator 390 to sense zero voltage amplitude intersections 240 by the incoming signal 220 through time at its signal or non-inverting input 380. When the slope of the resultant delayed signal 220 is positive going as measured from the zero voltage point 240, the comparator 390 will saturate and when negative, it will unsaturate thus outputting at those times a leading edge 455 and a trailing edge 457, respectively, of a digital signal 450. In effect the comparator 390 makes transitions at the zero points 240 of the delayed signal 220 which is just past the peak 250 or 0.707 of the peak 250 of the original signal 150, as mentioned supra. Thus the resultant delayed sinusoidal signal 220 is digitized giving the digital pulse signal 450 on line 460 whose widths 470 are proportional to the positive-negative going frequency slope trigger or zero amplitude points 240 of the sinusoidal signal 220.

An additional feature of the comparator 390 is its hystersis switching. The hystersis switching or hystersis threshold switching implies that the threshold depends upon the past history of the threshold signal, that is, if a positive going signal or a frequency slope direction that is positive has last been detected, the output signal 450 of the comparator 390 on line 460 will not change state until the input 220 on line 230 becomes a negative going signal at the threshold point 240 at which point triggering of a transition takes place and vice versa. In the preferred embodiment, as mentioned supra, this trigger point is the zero amplitude point 240 of the resultant signal 220 which occurs a fixed delay after peak 250 of the undelayed signal 150. Also by digitizing the inputted sinusoidal signal 220 on line 230, the amplitude modulation noise 50 is de-facto eliminated.

Parallel lines 490 and 500, branching out from a common terminus 510 with the output line 460 of the comparator 390, input signal 450 to a first pulse generator 520 and to a second pulse generator 530, respectively, where both generators are single shot multivibrators with 55 ms. periods. The first pulse generator 520 triggers on the positive peaks 540 and the second generator 530 triggers on the negative peaks 550 of the digitized signal 450. An equivalent alternative embodiment to the negative triggering second pulse generator 530 is to operatively dispose an inverter on line 500 between the comparator 390 and the second pulse generator 530 where the second pulse generator 530, which is now positive triggering, would trigger on psuedo positive peaks 310. The output signals 560 and 570 from the pulse generators 520 and 530 are carried on lines 580 and 590, respectively, which input to an OR gate 600. The net effect of the pulse generators 520 and 530 in combination with the OR gate 600 is to produce a final digitized output signal 610 on line 620 whose frequency, 12 KC, is double that of the digitized signal 450 on line 460 from the comparator 390 and, as a result, also double that of the input signal 20.

The advantages of the herein described system include the fact that zero-crossing detection of the tachometer signal 20, which is only an approximation at high frequencies due to high noise sensitivity, is no longer used, but rather a psuedo zero-crossing detection is provided which is a delayed peak-crossing detection resulting from subtracting the original signal 150 from a delayed signal 190 thereof, thus providing for high noise immunity even at high frequencies. An additional advantage is realized by doubling the frequency of the signal based on slope change, thus giving a device using the output of the system a faster indication of any speed changes that occur in the rotating shaft that is being measured. These advantages, when combined provide a system that quickly and accurately measures the speed of rotation of shafts that are rotated at very high speeds.

What is claimed is:

1. The method of digitizing a signal from an optical tachometer comprising the steps of:
   a. subtracting and amplifying a signal carrying line from a non-signal carrying line originating from the optical tachometer to thereby substantially remove line induced noise and to increase the gain of the subtracted signal,
   b. filtering the subtracted signal to remove the remainder of said line induced noise,
   c. reamplifying the filtered signal to recover any loss of gain incurred in said filter,
   d. delaying the reamplified signal,
   e. subtracting the delayed signal from the reamplified signal to thereby obtain a resultant signal that is uniformly delayed in time such that its zero amplitude points occur a fixed delay after the peak points of the reamplified signal,
   f. alternating the level of a constant amplitude signal to create a digitized signal whenever the resultant signal intersects a reference level, said alternating occurring only when adjacent slopes of the resultant signal at the reference level intersection point are of opposite directions, and
   g. doubling the frequency of the digitized signal by triggering on the positive and negative peaks thereof, thereby causing frequency changes of the sinusoidal signal to be sensed on every slope direction change.

2. The method of digitizing a signal as defined in claim 1 wherein said step of delaying the reamplified signal may be varied from 0° to 180° depending on the value of impedance that is used.

3. The method of digitizing a signal as defined in claim 2 wherein said step of subtracting the delayed signal from the reamplified signal is effective to vary the delay of the resultant signal to a degree proportional to said impedance that is used.

4. An improved system for digitizing a high frequency sinusoidal signal from an optical tachometer comprising:
   a. a differential amplifier coupled to said optical tachometer by a signal carrying line and a non-signal carrying line, said non-signal carrying line being subtracted from the signal carrying line such that the amplified output therefrom is a high gain signal having substantially reduced line-induced noise,
   b. a low pass filter coupled to said differential amplifier and effective for filtering out high frequency noise components,
   c. a buffer amplifier coupled to said filter and effective for reamplifying the filtered signal to compensate for gain losses incurred in said filter,
   d. an artifical delay line coupled to said buffer amplifier and effective for delaying the reamplified signal and for subtracting the delayed signal from the undelayed signal to thereby produce a uniformly delayed resultant signal through time such that the zero amplitude points thereof delayably concur just after the peak points of the reamplified signal,
   e. a comparator coupled to said buffer amplifier and to said delay line and effective for digitizing said resultant signal when the slope direction thereof as sensed thereby is opposite the preceding one, said comparator being operative also to not digitize said resultant signal when the slope direction thereof is identical to said preceding one, and
   f. a pair of pulse generators parallely coupled to said comparator and effective for trigger pulsing on the positive and negative peaks, respectively, of said resultant signal and for outputting signals to an OR gate to thereby effectively double the frequency of said original sinusoidal signal.

5. The improved system for digitizing a high frequency sinusoidal signal defined in claim 4 wherein said artifical delay line is operative to cause a delay in the resultant signal that is proportional to the impedance that is used.

6. The improved system for digitizing a high frequency sinusoidal signal defined in claim 4 wherein each of said pair of pulse generators is a single shot multivibrator.

7. The improved system for digitizing a high frequency sinusoidal signal defined in claim 6 wherein an inverter is interposed between said comparator and said pulse generator for trigger pulsing on said negative peaks of said resultant signal, whereby said generator would be rendered effective for triggering pulses on the psuedo positive peaks of said resultant signal.

8. A high frequency digitizing device for measuring the speed of a rotating shaft, said device comprising a transducer operatively coupled to said shaft, a differential amplifier coupled to said transducer for removing line induced noise and for amplifying the signal received from said transducer, a filter coupled to said differential amplifier for removing high frequency noise from the signal produced by said differential amplifier, a buffer amplifier coupled to said filter for replacing the gain that is lost in said filter, an artifical delay line coupled to said buffer amplifier for delaying the output therefrom and for subtracting the delayed signal from the undelayed signal to thereby produce a delayed resultant signal, a comparator for digitizing said resultant signal, a pair of pulse generators coupled in parallel to said comparator and effective for triggering on the positive and negative peaks of the comparator's output signal, and an OR gate coupled to said pair of pulse generators whereby the outputs thereof are ORed together to double the frequency of the signal received from said transducer, said artifical delay line being characterized by an impedance that depending on its value will be operative to proportionally effect a phase shift delay of the buffer amplifier signal thereby enabling the device to carry out a delayed peak detection of the input signal using zero-crossing detection of the resultant signal.

* * * * *

UNITED STATES PATENT OFFICE
CERTIFICATE OF CORRECTION

PATENT NO. : 3,965,430
DATED : June 22, 1976
INVENTOR(S) : Arnold W. Brandt

It is certified that error appears in the above-identified patent and that said Letters Patent are hereby corrected as shown below:

Col. 3, line 43, should read --$L_1 = (L)$ 270--.

Signed and Sealed this

Twenty-eighth Day of September 1976

[SEAL]

Attest:

RUTH C. MASON
Attesting Officer

C. MARSHALL DANN
Commissioner of Patents and Trademarks